United States Patent
Kashiwase et al.

(10) Patent No.: US 8,442,574 B2
(45) Date of Patent: May 14, 2013

(54) RADIO COMMUNICATION METHOD AND RADIO COMMUNICATION TERMINAL

(75) Inventors: Susumu Kashiwase, Yokohama (JP); Kugo Morita, Yokohama (JP)

(73) Assignee: Kyocera Corporation, Kyoto (JP)

( * ) Notice: Subject to any disclaimer, the term of this patent is extended or adjusted under 35 U.S.C. 154(b) by 891 days.

(21) Appl. No.: 12/375,398

(22) PCT Filed: Jul. 27, 2007

(86) PCT No.: PCT/JP2007/064754
§ 371 (c)(1),
(2), (4) Date: Oct. 5, 2009

(87) PCT Pub. No.: WO2008/013259
PCT Pub. Date: Jan. 31, 2008

(65) Prior Publication Data
US 2010/0016010 A1    Jan. 21, 2010

(30) Foreign Application Priority Data
Jul. 28, 2006    (JP) .................................. 2006-207247

(51) Int. Cl.
    *H04B 7/00*    (2006.01)
(52) U.S. Cl.
    USPC ............................. 455/522; 370/330; 370/352
(58) Field of Classification Search .................. 455/522
    See application file for complete search history.

(56) References Cited

U.S. PATENT DOCUMENTS

| | | | |
|---|---|---|---|
| 4,165,493 A * | 8/1979 | Harrington | 330/207 P |
| 5,592,131 A * | 1/1997 | Labreche et al. | 332/103 |
| 5,761,622 A * | 6/1998 | Priest | 455/522 |
| 5,860,057 A * | 1/1999 | Ishida et al. | 455/12.1 |
| 5,987,333 A * | 11/1999 | Sole | 455/522 |
| 6,574,456 B2 * | 6/2003 | Hamabe | 455/63.3 |
| 6,819,706 B1 * | 11/2004 | Lim | 375/130 |
| 6,823,187 B2 * | 11/2004 | Hamabe | 455/454 |
| 7,016,320 B1 * | 3/2006 | Petersson et al. | 370/331 |
| 7,039,410 B2 * | 5/2006 | Jovanovic | 455/444 |
| 7,116,982 B2 * | 10/2006 | Balachandran et al. | 455/452.2 |
| 7,260,138 B1 * | 8/2007 | Nakagawa | 375/146 |
| 7,340,006 B2 * | 3/2008 | Yun et al. | 375/296 |
| 7,450,355 B2 * | 11/2008 | Ochiai | 361/31 |
| 7,616,677 B2 * | 11/2009 | Koo et al. | 375/141 |
| 7,742,444 B2 * | 6/2010 | Mese et al. | 370/318 |
| 7,885,608 B2 * | 2/2011 | Nilsson et al. | 455/69 |

(Continued)

FOREIGN PATENT DOCUMENTS

JP    2003-087192    3/2003

OTHER PUBLICATIONS cdma 2000 High Rate Packet Data Air Interface 3GPP2 C.S.0024 Version 1.0, 3GPP2, Jun. 2006.

*Primary Examiner* — Hai Nguyen
(74) *Attorney, Agent, or Firm* — DLA Piper LLP (US)

(57) ABSTRACT

A method includes the steps of calculating a transmission power difference between a first carrier and a second carrier, and determining whether or not the transmission power difference exceeds a threshold set up on the basis of a maximum transmission power difference allowable between the first carrier and the second carrier. When the transmission power difference exceeds the threshold set up on the basis of the maximum transmission power difference, the transmission power of the first carrier or the second carrier is controlled while maintaining the transmission power difference within the maximum transmission power difference and not complying with power control information corresponding to the first carrier or the second carrier.

12 Claims, 11 Drawing Sheets

U.S. PATENT DOCUMENTS

| | | | |
|---|---|---|---|
| 7,894,380 B2 * | 2/2011 | Sun et al. | 370/320 |
| 7,917,165 B2 * | 3/2011 | Sun et al. | 455/522 |
| 7,929,472 B2 * | 4/2011 | Gu et al. | 370/310 |
| 7,941,174 B2 * | 5/2011 | Breuer et al. | 455/522 |
| 7,970,407 B2 * | 6/2011 | Vincent | 455/446 |
| 8,077,654 B2 * | 12/2011 | Sutivong et al. | 370/328 |
| 8,116,351 B2 * | 2/2012 | Koo et al. | 375/141 |
| 8,145,251 B2 * | 3/2012 | Love et al. | 455/522 |
| 8,175,062 B2 * | 5/2012 | Halfmann et al. | 370/332 |
| 8,179,876 B2 * | 5/2012 | Agrawal et al. | 370/343 |
| 8,200,272 B2 * | 6/2012 | Han | 455/522 |
| 8,238,923 B2 * | 8/2012 | Julian et al. | 455/450 |
| 8,285,319 B2 * | 10/2012 | Shin et al. | 455/522 |
| 8,290,530 B2 * | 10/2012 | Morita et al. | 455/522 |
| 8,320,495 B2 * | 11/2012 | Kashiwase et al. | 375/295 |
| 8,345,636 B2 * | 1/2013 | Ofuji et al. | 370/332 |
| 8,346,178 B2 * | 1/2013 | Morita | 455/69 |
| 2003/0103469 A1 * | 6/2003 | Setty et al. | 370/280 |
| 2004/0066795 A1 * | 4/2004 | Zhang | 370/442 |
| 2004/0171352 A1 * | 9/2004 | Maeda et al. | 455/67.13 |
| 2004/0171401 A1 * | 9/2004 | Balachandran et al. | 455/522 |
| 2005/0201308 A1 * | 9/2005 | Sekiya et al. | 370/310 |
| 2006/0030323 A1 * | 2/2006 | Ode et al. | 455/436 |
| 2006/0034364 A1 * | 2/2006 | Breitzmann et al. | 375/238 |
| 2006/0062507 A1 * | 3/2006 | Yanik et al. | 385/5 |
| 2007/0097962 A1 * | 5/2007 | Yoon et al. | 370/352 |
| 2008/0194281 A1 * | 8/2008 | Sun et al. | 455/522 |
| 2009/0029653 A1 * | 1/2009 | Halfmann et al. | 455/69 |
| 2009/0040975 A1 * | 2/2009 | Vijayan et al. | 370/329 |
| 2009/0122757 A1 * | 5/2009 | Cave et al. | 370/329 |
| 2009/0149140 A1 * | 6/2009 | Borran et al. | 455/114.2 |
| 2010/0056169 A1 * | 3/2010 | Koo et al. | 455/450 |
| 2010/0067474 A1 * | 3/2010 | Vijayan et al. | 370/329 |
| 2011/0282999 A1 * | 11/2011 | Teague et al. | 709/226 |

\* cited by examiner

RADIO COMMUNICATION METHOD AND RADIO COMMUNICATION TERMINAL

CROSS-REFERENCE TO THE RELATED APPLICATIONS

This application is a national stage of international application No. PCT/JP2007/064754 filed Jul. 27, 2007, which also claims the benefit of priority under 35 UCS 119 to Japanese Patent Application No. 2006-207247 filed Jul. 28,2006, the entire contents of which are incorporated herein by reference.

TECHNICAL FIELD

The present invention relates to a radio communication method in reverse link by multicarrier using multiple carriers, and also to a radio communication terminal for performing communications by multicarrier.

BACKGROUND ART

In recent years, as applications, such as moving images or games, to be handled have been diversified and sophisticated, the data transmission rate in a mobile communication system has been strongly demanded to be speeded up. With such a background, the Third Generation Partnership Project 2 (3GPP2), for example, defines a scheme for implementing high speed data transmissions by using multiple carriers bundled in an upper layer (so-called multicarrier).

In the case of multicarrier, a radio communication terminal (Access Terminal) generally employs a configuration in which multiple carriers are transmitted by use of a single radio communication network, in view of downsizing, reduction in manufacturing cost or the like. Thus, in order to reduce interference between adjacent carriers that are adjacent to each other with a predetermined frequency interval (1.25 MHz interval), it is provided that a transmission power difference between adjacent carriers should be within a predetermined threshold (MaxRLTxPwrDiff, 15 dB, for example) (Non-patent document 1, for example).
Non-patent document 1: "cdma2000 High Rate Packet Data Air Interface 3GPP2 C.S0024-B Version 1.0", 3GPP2, June 2006

DISCLOSURE OF THE INVENTION

As described above, 3GPP2 provides that a transmission power difference between adjacent carriers be controlled to be within a predetermined threshold (MaxRLTxPwrDiff). In some cases, however, the transmission power difference cannot be maintained within the predetermined threshold under some communication conditions between a radio communication terminal and a radio base station (Access Network).

For example, when a radio communication terminal moves away from a first radio base station that is currently performing communications by use of a first carrier and simultaneously moves toward a second radio base station that is currently performing communications by use of a second carrier adjacent to the first carrier with a predetermined frequency interval, the radio communication terminal needs to increase the transmission power of the first carrier to maintain communications with the first radio base station using the first carrier. In addition, as the radio communication terminal comes closer to the second radio base station, it reduces the transmission power of the second carrier.

In this way, in some cases, the radio communication terminal may not be able to maintain the transmission power difference within the predetermined threshold to maintain communications currently being performed with the first radio base station and the second radio base station.

Hence, the present invention has been made in light of such the circumstances, and it is an object of the present invention to provide a radio communication method and a radio communication terminal that are capable of maintaining communications by multicarrier, while preventing interference between adjacent carriers which are adjacent to each other with a predetermined frequency interval.

An aspect of the present invention provides a radio communication method in reverse link by multicarrier using at least a first carrier and a second carrier adjacent to the first carrier with a predetermined frequency interval. The radio communication method includes the steps of: controlling transmission power of the first carrier in accordance with power control information generated by a radio base station connected via the first carrier on the basis of reception quality of reverse link data using the first carrier; controlling transmission power of the second carrier in accordance with power control information generated by a radio base station connected via the second carrier on the basis of reception quality of reverse link data using the second carrier; calculating a transmission power difference between the first carrier and the second carrier; and determining whether or not the transmission power difference exceeds a threshold set up on the basis of a maximum transmission power difference allowable between the first carrier and the second carrier. In the radio communication method, in the step of controlling the transmission power of one of the first carrier and the second carrier, the transmission power of the one of the first carrier and the second carrier is controlled while maintaining the transmission power difference within the maximum transmission power difference and not complying with the power control information corresponding to the one of the first carrier and the second carrier when the transmission power difference exceeds the threshold set up on the basis of the maximum transmission power difference.

According to this aspect, it is possible to maintain communications by multicarrier while suppressing interference between the adjacent carriers adjacent to each other with the predetermined frequency interval by controlling the transmission power of the first carrier or the second carrier while maintaining the transmission power difference within the maximum transmission power difference and not complying with the power control information corresponding to the first carrier or the second carrier when the transmission power difference exceeds the threshold set up on the basis of the maximum transmission power difference.

Another aspect of the present invention provides the above-mentioned aspect of the present invention, in which, in the step of controlling the transmission power of one of the first carrier and the second carrier, processing to increase the transmission power of the carrier having higher transmission power out of the first carrier and the second carrier is stopped when the power control information corresponding to the carrier having higher transmission power issues an instruction to increase the transmission power in the case of the transmission power difference exceeding the threshold set up on the basis of the maximum transmission power difference.

Another aspect of the present invention provides the above-mentioned aspect of the present invention, in which, in the step of controlling the transmission power of one of the first carrier and the second carrier, processing to decrease the transmission power of the carrier having lower transmission power out of the first carrier and the second carrier is stopped when the power control information corresponding to the carrier having lower transmission power issues an instruction to decrease the transmission power in the case of the transmission power difference exceeding the threshold set up on the basis of the maximum transmission power difference.

Another aspect of the present invention provides the above-mentioned aspect of the present invention, in which, in the step of controlling the transmission power of one of the first carrier and the second carrier, the transmission powers of both of the first carrier and the second carrier are increased when, out of the first carrier and the second carrier, the power control information corresponding to the carrier having higher transmission power issues an instruction to increase the transmission power while the power control information corresponding to the carrier having lower transmission power issues an instruction to decrease the transmission power in the case of the transmission power difference exceeding the threshold set up on the basis of the maximum transmission power difference.

Another aspect of the present invention provides the above-mentioned aspect of the present invention, in which, in the step of controlling the transmission power of one of the first carrier and the second carrier, the transmission powers of both of the first carrier and the second carrier are decreased when, out of the first carrier and the second carrier, the power control information corresponding to the carrier having higher transmission power issues an instruction to increase the transmission power while the power control information corresponding to the carrier having lower transmission power issues an instruction to decrease the transmission power in the case of the transmission power difference exceeding the threshold set up on the basis of the maximum transmission power difference.

Another aspect of the present invention provides the above-mentioned aspect of the present invention, in which: the transmission power difference is calculated in a predetermined cycle in the step of calculating the transmission power difference; the radio communication method further includes the step of determining whether or not the transmission power difference is increasing on the basis of the transmission power difference calculated in the predetermined cycle; and, in the step of controlling the transmission power of one of the first carrier and the second carrier, the transmission power of the one of the first carrier and the second carrier is controlled without complying with the power control information corresponding to the one of the first carrier and the second carrier when the transmission power difference is determined to be increasing.

An aspect of the present invention provides a radio communication terminal which performs communications by multicarrier using at least a first carrier and a second carrier adjacent to the first carrier with a predetermined frequency interval. The radio communication terminal includes: a transmission power controller (a transmission power controller 21) configured to control transmission power of the first carrier in accordance with power control information generated by a radio base station connected via the first carrier on the basis of reception quality of reverse link data using the first carrier, and to control transmission power of the second carrier in accordance with power control information generated by a radio base station connected via the second carrier on the basis of reception quality of reverse link data using the second carrier; a transmission power difference calculator (a transmission power difference calculator 22) configured to calculate a transmission power difference between the first carrier and the second carrier; and a transmission power difference determination unit (the transmission power difference calculator 22) configured to determine whether or not the transmission power difference calculated by the transmission power difference calculator exceeds a maximum transmission power difference allowable between the first carrier and the second carrier. In the radio communication terminal, the transmission power controller controls the transmission power of one of the first carrier and the second carrier while maintaining the transmission power difference within the maximum transmission power difference and not complying with the power control information corresponding to the one of the first carrier and the second carrier when the transmission power difference exceeds the maximum transmission power difference.

Another aspect of the present invention provides the above-mentioned aspect of the present invention, in which the transmission power controller stops processing to increase the transmission power of the carrier having higher transmission power out of the first carrier and the second carrier when the power control information corresponding to the carrier having higher transmission power issues an instruction to increase the transmission power in the case of the transmission power difference exceeding the threshold set up on the basis of the maximum transmission power difference.

Another aspect of the present invention provides the above-mentioned aspect of the present invention, in which the transmission power controller stops processing to decrease the transmission power of the carrier having lower transmission power out of the first carrier and the second carrier when the power control information corresponding to the carrier having lower transmission power issues an instruction to decrease the transmission power in the case of the transmission power difference exceeding the threshold set up on the basis of the maximum transmission power difference.

Another aspect of the present invention provides the above-mentioned aspect of the present invention, in which the transmission power controller increases the transmission powers of both of the first carrier and the second carrier when, out of the first carrier and the second carrier, the power control information corresponding to the carrier having higher transmission power issues an instruction to increase the transmission power while the power control information corresponding to the carrier having lower transmission power issues an instruction to decrease the transmission power in the case of the transmission power difference exceeding the threshold set up on the basis of the maximum transmission power difference.

Another aspect of the present invention provides the above-mentioned aspect of the present invention, in which the transmission power controller decreases the transmission powers of both of the first carrier and the second carrier when, out of the first carrier and the second carrier, the power control information corresponding to the carrier having higher transmission power issues an instruction to increase the transmission power while the power control information corresponding to the carrier having lower transmission power issues an instruction to decrease the transmission power in the case of the transmission power difference exceeding the threshold set up on the basis of the maximum transmission power difference.

Another aspect of the present invention provides the above-mentioned aspect of the present invention, in which: the transmission power difference calculator calculates the transmission power difference in a predetermined cycle; the radio communication terminal further includes a power difference determination unit (a transmission power difference determination unit 24) which determines whether or not the transmission power difference is increasing on the basis of the transmission power difference calculated by the transmission power difference calculator in the predetermined cycle; and the transmission power controller controls the transmission power of one of the first carrier and the second carrier without complying with the power control information corresponding to the one of the first carrier and the second carrier when the power difference determination unit determines that the transmission power difference is increasing.

According to the aspects of the present invention, it is possible to provide the radio communication method and the radio communication terminal which are capable of maintaining communications by multicarrier while suppressing interference between the adjacent carriers adjacent to each other with the predetermined frequency interval.

BEST MODES FOR CARRYING OUT THE INVENTION

Figure 1:
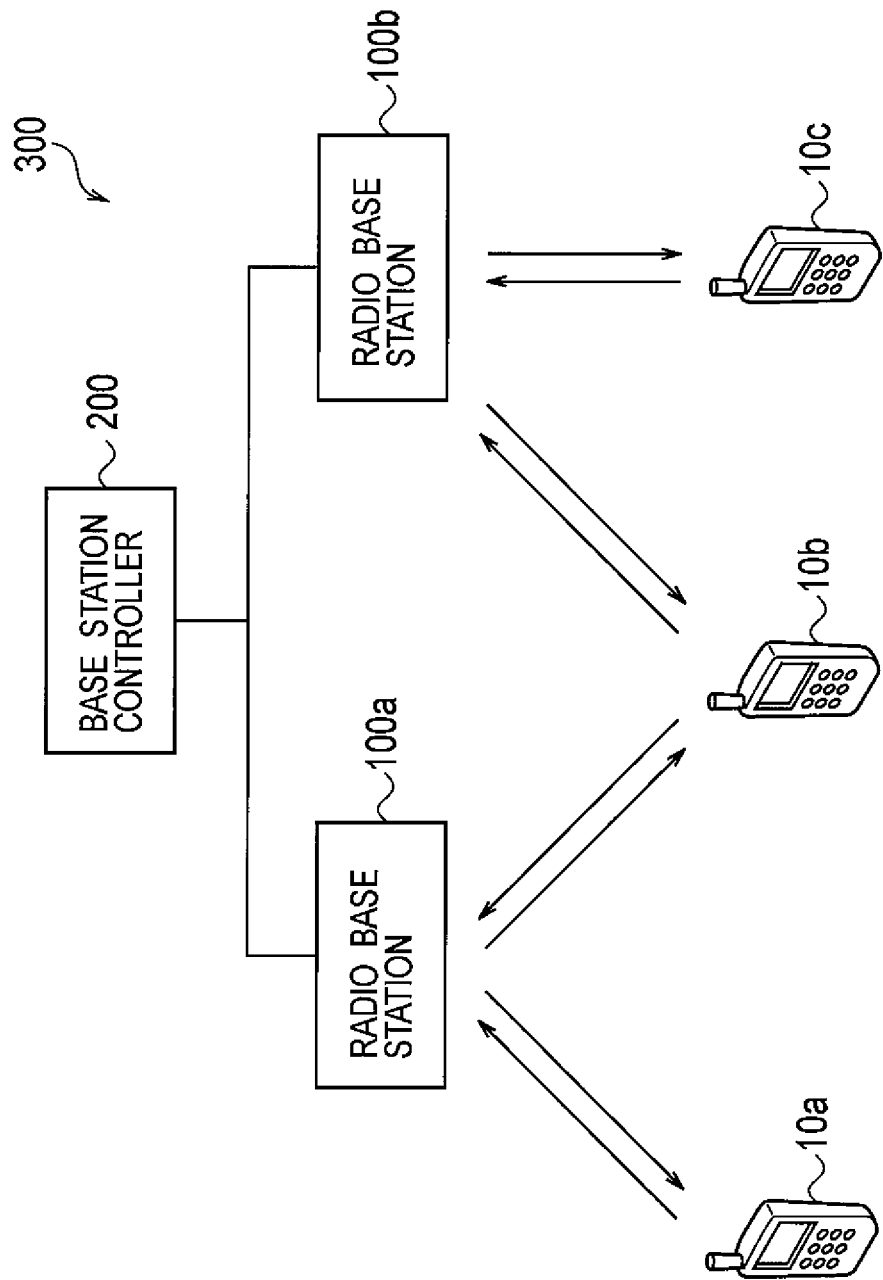
FIG. 1 is a view showing an overall schematic configuration of a communication system 300 according to a first embodiment of the present embodiment.

Next, embodiments of the present invention will be described. In the following description of the drawings, a same or similar reference numeral is given to a same or similar part. However, it should be noted that the drawings are schematic and the ratio of each dimension differs from actual ratio.

Thus, specific dimensions and the like are to be determined by referring to the following description. In addition, a relationship or a ratio of mutual dimensions may differ among the drawings, as a matter of course.

[First Embodiment]
(Overall Schematic Configuration of Communication System)

An overall schematic configuration of a communication system according to a first embodiment of the present embodiment will be described hereinafter with reference to the drawings. FIG. 1 shows an overall schematic configuration of a communication system 300 according to the first embodiment of the present embodiment.

As shown in FIG. 1, the communication system 300 includes multiple radio communication terminals 10 (a radio communication terminal 10a to a radio communication terminal 10c), multiple radio base stations 100 (a radio base station 100a and a radio base station 10b), and a base station controller 200.

Each of the radio communication terminals 10 transmits reverse link data to each of the radio base stations 100 by using a reverse link frequency band assigned for transmitting the reverse link data. Specifically, the reverse link frequency band is divided into multiple carriers. Then, the radio communication terminal 10 transmits the reverse link data to the base radio base station 100 by using the multiple carriers bundled in an upper layer (multicarrier).

In addition, the radio communication terminal 10 receives forward link data from the radio base station 100 by using a forward link frequency band assigned for transmitting the forward link data. Specifically, the forward link frequency band is divided into multiple carriers. Then, the radio communication terminal 10 receives the forward link data from the radio base station 100 by using the multiple carriers bundled in an upper layer (multicarrier).

Note that the radio communication terminal 10, as in the case of the radio communication terminal 10a or the radio communication terminal 10c, may communicate with a single radio base station 100. In addition, the radio communication terminal 10 may communicate with multiple radio base stations 100, as in the case of the radio communication terminal 10b.

The radio base station 100 receives the reverse link data from the radio communication terminal 10 by using the reverse link frequency band assigned for transmitting the reverse link data. The radio base station 100 also transmits the forward link data to the radio communication terminals 10 by using the forward link frequency band assigned for transmitting the forward link data.

The base station controller 200 controls communications made between the radio communication terminals 10 and the radio base stations 100. The base station controller 200 performs operations such as handoff in which the radio communication terminal 10 switches one radio base station 100 for communicating therewith to the other.

In the communication system 300, the radio communication terminal 10 performs open loop control in which transmission power of reverse link data is controlled on the basis of received power of forward link data received from the radio base station 100. The radio communication terminal 10 also performs closed loop control in which transmission power of reverse link data is controlled on the basis of power control information received from the radio base station 100. The power control information herein is information that the radio base station 100 generates on the basis of reception quality (for example, signal to interference ratio (SIR)) of the reverse link data received from the radio communication terminal 10.

(Reverse Link Frequency Band)

Figure 2:
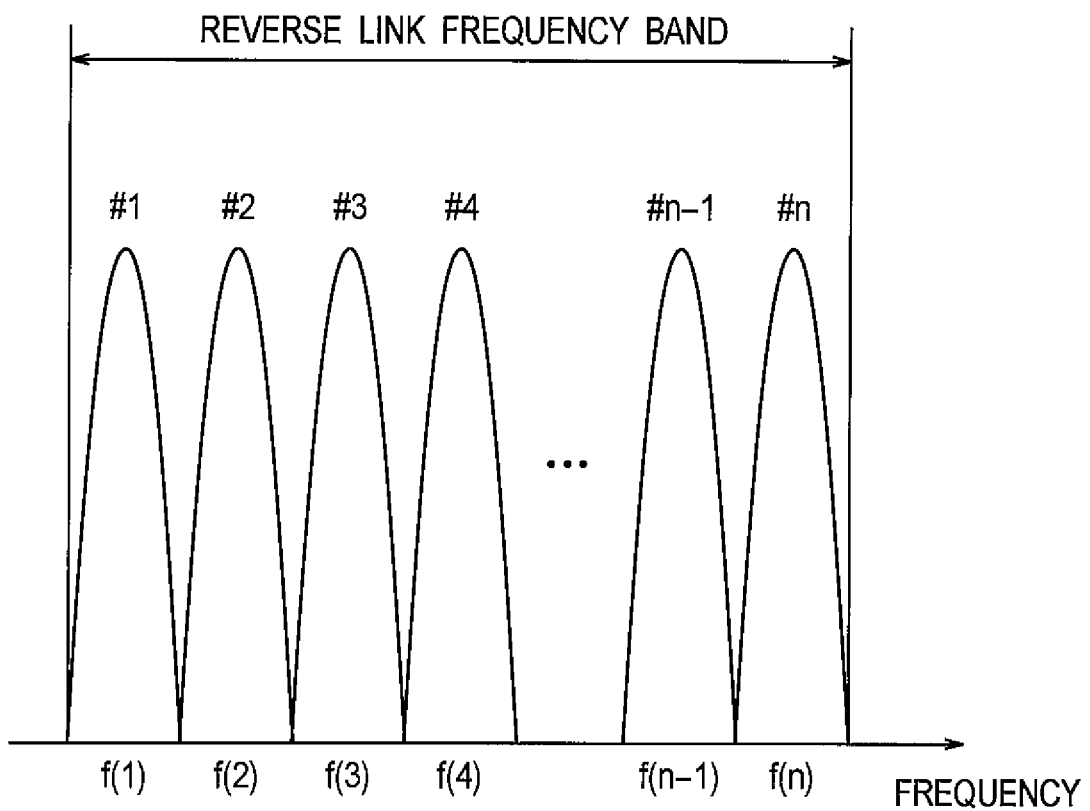
FIG. 2 is a view showing frequency bandwidth in reverse link according to the first embodiment of the present invention.

A reverse link frequency band according to the first embodiment of the present invention will be described hereinafter with reference to the drawings. FIG. 2 shows the reverse link frequency band according to the first embodiment of the present invention.

As shown in FIG. 2, the reverse link frequency band is divided into multiple carriers (carrier #1 to carrier #n). In addition, center frequencies of the carriers are f(1) to f(n), respectively. The center frequencies of the carriers are adjacent to each other being spaced apart at a predetermined frequency interval (e.g., 1.25 MHz). Two carriers having their center frequencies being adjacent to each other will be hereinafter referred to as adjacent carriers.

(Configuration of Radio Communication Terminal)

Figure 3:
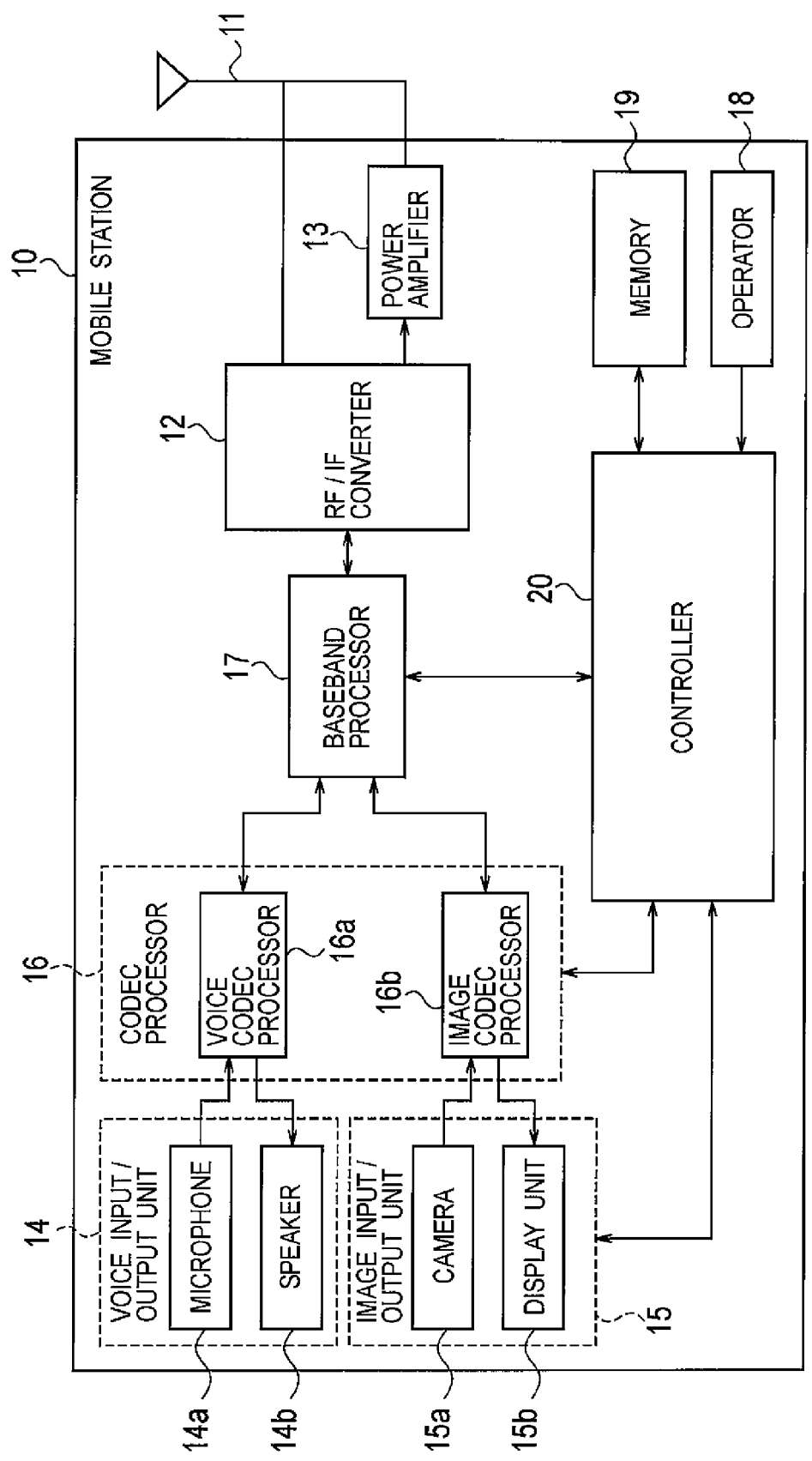
FIG. 3 is a block configuration diagram of a radio communication terminal 10 according to the first embodiment of the present invention.

A configuration of the radio communication terminal according to the first embodiment of the present invention will be described hereinafter with reference to the drawings. FIG. 3 is a functional block configuration diagram showing the radio communication terminal 10 according to the first embodiment of the present invention. Since the radio communication terminals 10a to 10c have similar configurations, they will be collectively referred to as a radio communication terminal 10 in the following description.

As shown in FIG. 3, the radio communication terminal 10 includes an antenna 11, an RF/IF converter 12, a power amplifier 13, a voice input/output unit 14, an image input/output unit 15, a codec processor 16, a baseband processor 17, an operator 18, a memory 19, and a controller 20.

The antenna 11 receives a signal (a reception signal) transmitted by the radio base stations 100. The antenna 11 also transmits a signal (a transmission signal) to the radio base station 100.

The RF/IF converter 12 converts a frequency (Radio Frequency (RF)) of a reception signal received by the antenna 11 into a frequency (Intermediate Frequency (IF)) to be handled by the baseband processor 17. The RF/IF converter 12 also converts the frequency (IF) of a transmission signal acquired from the baseband processor 17 into the frequency (RF) to be used in radio communications. In addition, the RF/IF converter 12 inputs the transmission signal converted into the radio frequency (RF) to the power amplifier 13.

The power amplifier 13 amplifies the transmission signal acquired from the RF/IF converter 12. The amplified transmission signal is inputted to the antenna 11.

The voice input/output unit 14 has a microphone 14a for collecting voice and a speaker 14b for outputting voice. The microphone 14a inputs a voice signal into the codec processor 16 on the basis of the collected voice. The speaker 14b outputs voice on the basis of the voice signal acquired from the codec processor 16.

The image input/output unit 15 includes a camera 15a for capturing an object, and a display unit 15b for displaying characters, images, and the like. The camera 15a inputs an image signal to the codec processor 16 on the basis of captured images (still images and moving images). The display unit 15b displays images on the basis of the image signal acquired from the codec processor 16. The display unit 15b also displays characters to be inputted through the operator 18.

The codec processor 16 includes: a voice codec processor 16a for encoding and decoding a voice signal according to a predetermined encoding scheme (EVRC (Enhanced Variable Rate Codec), AMR (Advanced Multi Rate Codec) or G.729 compliant with ITU-T, for example); and an image codec processor 16b for encoding and decoding an image signal according to a predetermined encoding scheme (MPEG-4, for example).

The voice codec processor 16a encodes a voice signal acquired from the voice input/output unit 14. The voice codec processor 16a also decodes a voice signal acquired from the baseband processor 17. The image codec processor 16b encodes an image signal acquired from the image input/output unit 15. The image codec processor 16b also decodes an image signal acquired from the baseband processor 17.

The baseband processor 17 modulates a transmission signal or demodulates a reception signal according to a predetermined modulation scheme (QPSK or 16QAM) or the like. Specifically, the baseband processor 17 modulates a baseband signal such as a voice signal or an image signal acquired from the codec processor 16. The modulated baseband signal (transmission signal) is inputted into the RF/IF converter 12. The baseband processor 17 also demodulates a reception signal acquired from the RF/IF converter 12. The demodulated reception signal (baseband signal) is inputted into the codec processor 16.

The baseband processor 17 modulates information generated by the controller 20. The modulated information (transmission signal) is inputted into the RF/IF converter 12. The baseband processor 17 also demodulates a reception signal acquired from the RF/IF converter 12. The demodulated reception signal is inputted into the controller 20.

The operator 18 is a group of keys formed of input keys for allowing characters, digits, and the like to be inputted, a response key for responding to incoming calls (calling), a calling key for outgoing calls (originating call), and the like. In addition, when each key is pressed, the operator 18 allows an input signal corresponding to the pressed key to be inputted to the controller 20.

The memory 19 stores therein a program for controlling operation of the radio communication terminal 10, various types of data such as incoming and outgoing call history, an address book, and the like. The memory 19 is formed of, for example, a flash memory that is a nonvolatile semiconductor memory, or a SEAM (Static Random Access Memory) that is a volatile semiconductor memory, or the like.

The controller 20 controls the operations of the radio communication terminal 10 (the image input/output unit 15, the codec processor 16, the baseband processor 17, and so forth) in accordance with the program stored in the memory 19.

Figure 4:
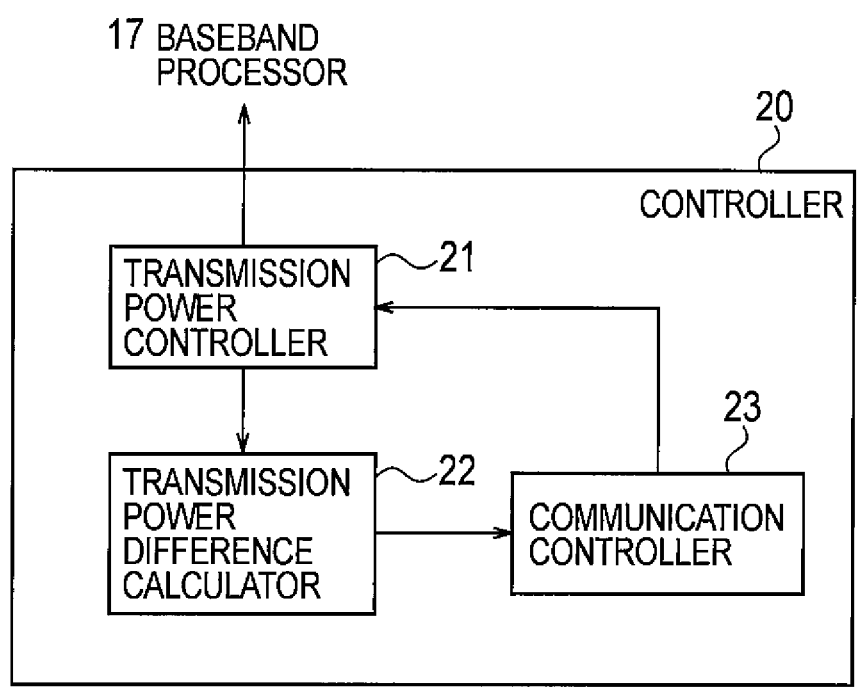
FIG. 4 is a functional block diagram of a controller 20 according to the first embodiment of the present invention.

Now, a configuration of the controller according to the first embodiment of the present invention will be described below with reference to the accompanying drawings. FIG. 4 is a functional block diagram showing the controller 20 according to the first embodiment of the present invention.

As shown in FIG. 4, the controller 20 includes a transmission power controller 21, a transmission power difference calculator 22, and a communication controller 23.

The transmission power controller 21 controls transmission power of reverse link data for each carrier.

Specifically, the transmission power controller 21 controls the transmission power of the reverse link data on the basis of reception quality (SIR, for example) of forward link data received from the radio base station 100 to which reverse link data is transmitted (open loop control).

The transmission power controller 21 also controls transmission power of reverse link data on the basis of power control information received from the radio base stations 100 to which reverse link data is transmitted (closed loop control). As described above, the power control information is information that the radio base station 100 generates on the basis of reception quality (SIR, for example) of the reverse link data. The power control information requests for a decrease or an increase in the transmission power of the reverse link data.

Here, when acquiring, from the communication controller 23, instruction information being an instruction to control the transmission power of the reverse link data without complying with the power control information, the transmission power controller 21 controls the transmission power of the adjacent carriers (the reverse link data) in accordance with the instruction information acquired from the communication controller 23 while maintaining the transmission power difference between the adjacent carriers within the maximum transmission power difference.

The transmission power difference calculator 22 calculates the difference in the transmission power of the reverse link data (hereinafter the transmission power difference) between the adjacent carriers. Moreover, the transmission power difference calculator 22 determines whether or not the transmission power difference between the adjacent carriers exceeds a threshold set up on the basis of the maximum transmission power difference (MaxRLTxPwrDiff) allowable between the adjacent carriers.

Meanwhile, the threshold to be set up on the basis of the maximum transmission power difference may be equal to the maximum transmission power difference itself or may be a value smaller than the maximum transmission power difference (such as a value obtained by multiplying the maximum transmission power difference by a predetermined ratio (0.9)).

Here, when the transmission power difference between the adjacent carriers exceeds the threshold set up on the basis of the maximum transmission power difference, the transmission power difference calculator 22 informs the communication controller 23 of the fact that the transmission power difference between the adjacent carriers has exceeded the threshold set up on the basis of the maximum transmission power difference.

When the fact that the transmission power difference between the adjacent carriers has exceeded the threshold set up on the basis of the maximum transmission power difference is informed, the communication controller 23 inputs the instruction information to the transmission power controller 21, the instruction information being an instruction to control the transmission power of the reverse link data without complying with the power control information.

Here, the instruction information may be information being an instruction to maintain the transmission power without change when the power control information corresponding to the carrier having higher transmission power out of the adjacent carriers issues an instruction to increase the transmission power.

Meanwhile, the instruction information may be information being an instruction to maintain the transmission power without change when the power control information corresponding to the carrier having lower transmission power out of the adjacent carriers issues an instruction to decrease the transmission power.

Further, the instruction information may be information being an instruction to increase the transmission powers of both of the adjacent carriers when the power control information corresponding to the carrier having higher transmission power out of the adjacent carriers issues an instruction to increase the transmission power while the power control information corresponding to the carrier having lower transmission power out of the adjacent carriers issues an instruction to decrease the transmission power.

Further, the instruction information may be information being an instruction to decrease the transmission powers of both of the adjacent carriers when the power control information corresponding to the carrier having higher transmission power out of the adjacent carriers issues an instruction to increase the transmission power while the power control information corresponding to the carrier having lower transmission power out of the adjacent carriers issues an instruction to decrease the transmission power.

As described above, when the power control information issues an instruction to expand the transmission power difference between the adjacent carriers and the transmission power of the carrier having lower transmission power falls below the predetermined threshold, the communication controller 23 inputs the instruction information being an instruction to increase the transmission powers of both of the adjacent carriers to the transmission power controller 21. On the other hand, when the power control information issues an instruction to expand the transmission power difference between the adjacent carriers and the transmission power of the carrier having lower transmission power is equal to or above the predetermined threshold, the communication controller 23 inputs the instruction information being an instruction to decrease the transmission powers of both of the adjacent carriers to the transmission power controller 21.

(Operation of Radio Communication Terminal)

The operation of the radio communication terminal according to the first embodiment of the present invention will be described below with reference to the drawings. FIG. 5 to FIG. 8 are flowcharts showing the operation of the radio communication terminal 10 according to the first embodiment of the present invention.

Hereinafter, a case where adjacent carriers include a carrier #1 and a carrier #2 will be described as an example. In addition, the radio communication terminal 10 is assumed to transmit reverse link data to the radio base station 100a by using the carrier #1, and to transmit reverse link data to the radio base station 100b by using the carrier #2.

First, main processing of controlling transmission power will be described with reference to FIG. 5. Note that the main processing of controlling transmission power is repeatedly performed in a predetermined cycle.

Figure 5:
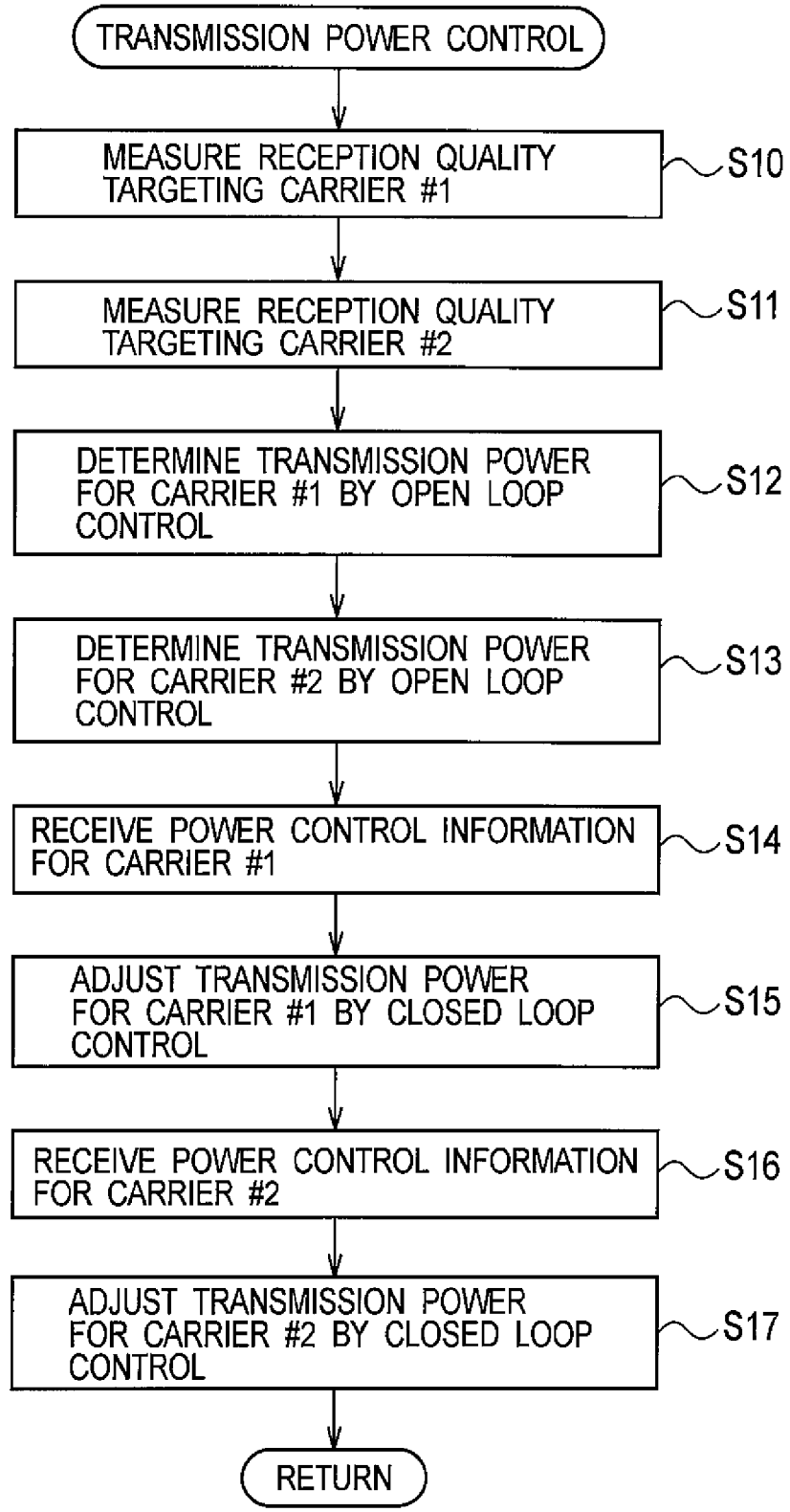
FIG. 5 is a flowchart showing operation of the radio communication terminal 10 according to the first embodiment of the present invention (Pattern 1).

As shown in FIG. 5, in step 10, the radio communication terminal 10 measures reception quality of forward link data targeting the carrier #1. Specifically, the radio communication terminal 10 measures the reception quality of the forward link data received from the radio base station 100a to which the radio communication terminal 10 transmits the reverse link data by using the carrier #1.

In step 11, the radio communication terminal 10 measures reception quality of forward link data targeting the carrier #2. Specifically, the radio communication terminal 10 measures the reception quality of the forward link data received from the radio base station 100b to which the radio communication terminal 10 transmits the reverse link data by using the carrier #2.

In step 12, the radio communication terminal 10 determines transmission power of the reverse link data to be transmitted by using the carrier #1 through the open loop control. Specifically, the radio communication terminal 10 determines the transmission power of the reverse link data to be transmitted by using the carrier #1 on the basis of the reception quality measured in step 10.

In step 13, the radio communication terminal 10 determines transmission power of the reverse link data to be transmitted by using the carrier #2 through the open loop control. Specifically, the radio communication terminal 10 determines the transmission power of the reverse link data to be transmitted by using the carrier #2 on the basis of the reception quality measured in step 11.

In step 14, the radio communication terminal 10 receives power control information for the carrier #1. Specifically, the radio communication terminal 10 receives the power control information from the radio base station 100a to which the radio communication terminal 10 transmits the reverse link data by using the carrier #1. Here, the power control information is the information generated by the radio base station 100a on the basis of the reception quality of the reverse link data to be transmitted by using the carrier #1.

In step 15, the radio communication terminal 10 adjusts the transmission power of the reverse link data to be transmitted by using the carrier #1 through the closed loop control. Specifically, the radio communication terminal 10 adjusts the transmission power of the reverse link data determined in step 12 on the basis of the power control information received in step 14.

That is, the radio communication terminal 10 transmits the reverse link data by using the carrier #1 at the transmission power determined by the open loop control and the closed loop control.

In step 16, the radio communication terminal 10 receives power control information for the carrier #2. Specifically, the radio communication terminal 10 receives the power control information from the radio base station 100b to which the radio communication terminal 10 transmits the reverse link data by using the carrier #2. Here, the power control information is the information generated by the radio base station 100b on the basis of the reception quality of the reverse link data to be transmitted by using the carrier #2.

In step 17, the radio communication terminal 10 adjusts the transmission power of the reverse link data to be transmitted by using the carrier #2 through the closed loop control. Specifically, the radio communication terminal 10 adjusts the transmission power of the reverse link data determined in step 13 on the basis of the power control information received in step 16.

Specifically, the radio communication terminal 10 transmits the reverse link data by using the carrier #2 at the transmission power determined by the open loop control and the closed loop control.

Next, the above-described processing in step 15 or step 17 (the closed loop control processing (1)) will be described with reference to FIG. 6.

Note that, the carrier the transmission power of which is to be controlled in the closed loop control processing will be hereinafter referred to as a control target carrier.

Figure 6:
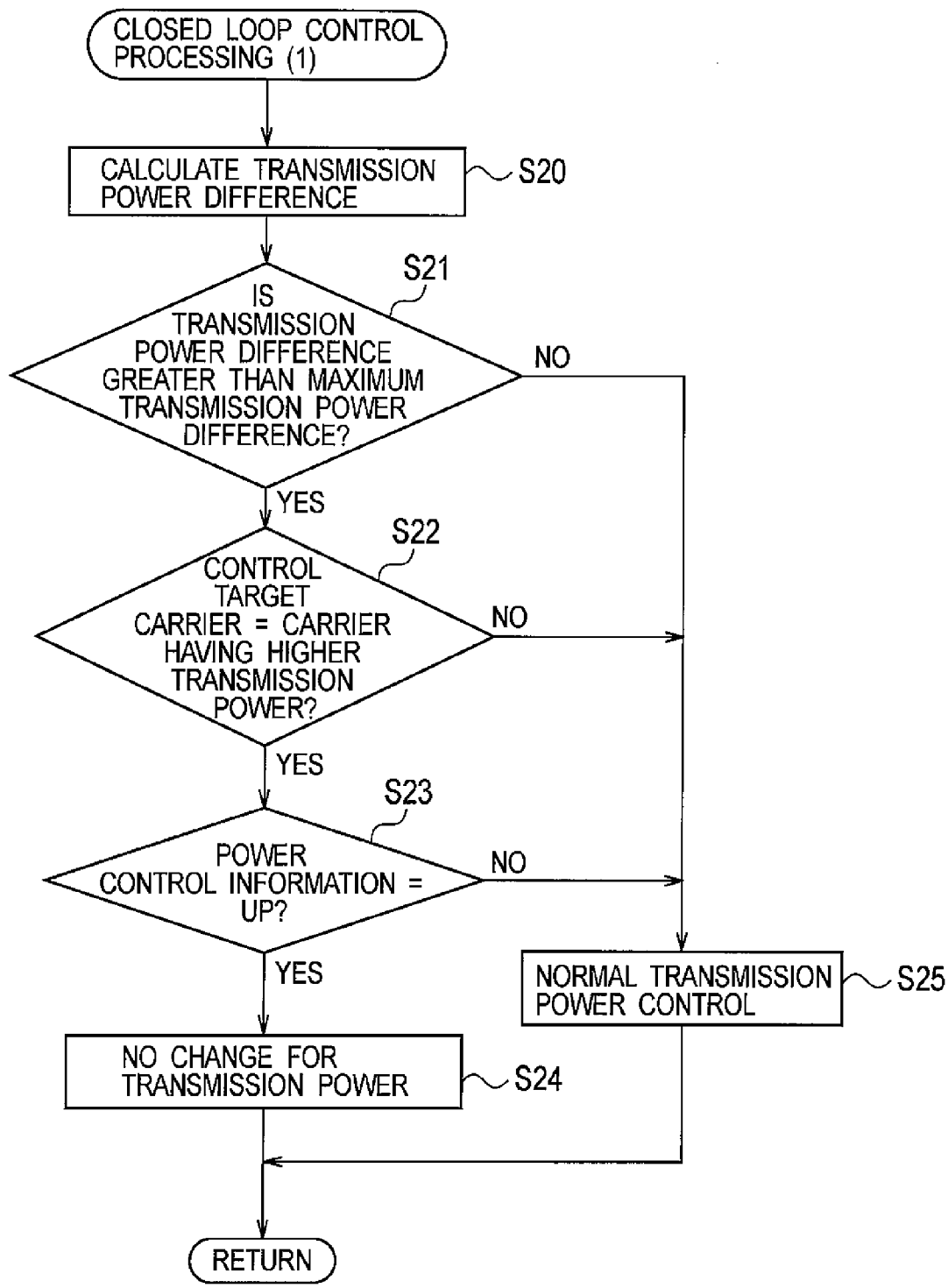
FIG. 6 is a flowchart showing the operation of the radio communication terminal 10 according to the first embodiment of the present invention (Pattern 2).

As shown in FIG. 6, in step 20, the radio communication terminal 10 calculates a difference in the transmission power (the transmission power difference) of the reverse link data between the adjacent carriers (the carrier #1 and the carrier #2).

In step 21, the radio communication terminal 10 determines whether or not the transmission power difference between the adjacent carriers exceeds the threshold that is set up on the basis of the maximum transmission power difference (MaxRLTxPwrDiff). The radio communication terminal 10 proceeds to the processing in step 22 when the transmission power difference between the adjacent carriers exceeds the threshold set up on the basis of the maximum transmission power difference. Meanwhile, when the transmission power difference between the adjacent carriers does not exceed the threshold set up on the basis of the maximum transmission power difference, the radio communication terminal 10 proceeds to the processing in step 25.

Here, as described previously, the threshold to be set up on the basis of the maximum transmission power difference may be equal to the maximum transmission power difference or may be a value smaller than the maximum transmission power difference (such as a value obtained by multiplying the maximum transmission power difference by a predetermined ratio (0.9)).

In step 22, the radio communication terminal 10 determines whether or not the control target carrier is the carrier which has higher transmission power and is included in the adjacent carriers. The radio communication terminal 10 proceeds to the processing in step 23 when the control target carrier is the carrier having higher transmission power. On the contrary, the radio communication terminal 10 proceeds to the processing in step 25 when the control target carrier is a carrier other than the carrier having higher transmission power.

In step 23, the radio communication terminal 10 determines whether or not the power control information corresponding to the control target carrier is the information being an instruction to increase the transmission power. The radio communication terminal 10 proceeds to the processing in step 24 when the power control information is the information being an instruction to increase the transmission power. On the contrary, the radio communication terminal 10 proceeds to the processing in step 25 when the power control information is the information being an instruction to decrease the transmission power.

In step 24, the radio communication terminal 10 does not change the transmission power of the control target carrier without complying with the power control information being an instruction to increase the transmission power. Alternatively, the radio communication terminal 10 may decrease the transmission power of the control target carrier.

In step 25, the radio communication terminal 10 controls transmission power of the control target carrier in accordance with the power control information.

Next, the above-described processing in step 15 or step 17 (the closed loop control processing (2)) will be described with reference to FIG. 7.

Figure 7:
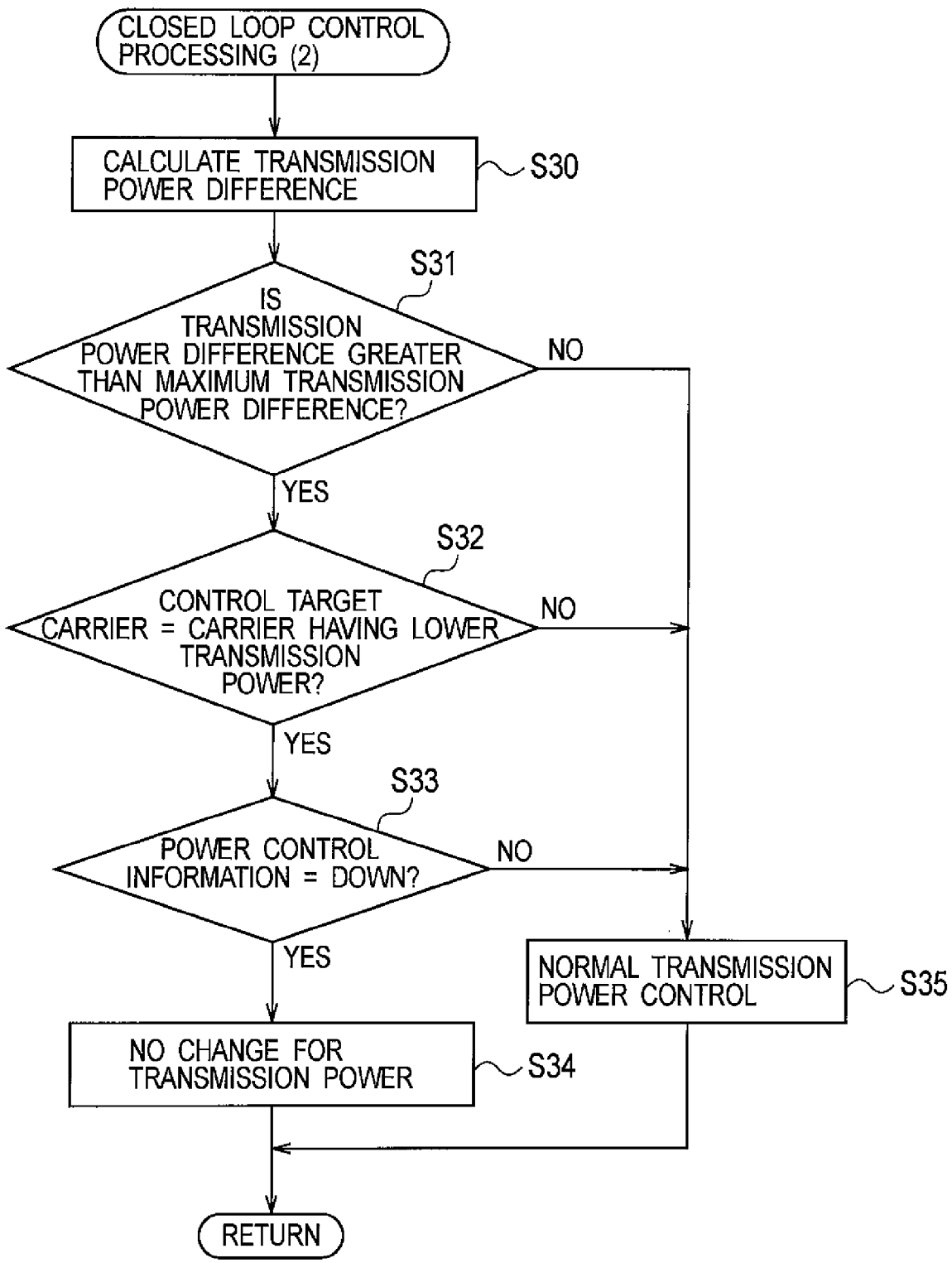
FIG. 7 is a flowchart showing the operation of the radio communication terminal 10 according to the first embodiment of the present invention (Pattern 3).

As shown in FIG. 7, in step 30, the radio communication terminal 10 calculates a difference in the transmission power (the transmission power difference) of the reverse link data between the adjacent carriers (the carrier #1 and the carrier #2).

In step 31, the radio communication terminal 10 determines whether or not the transmission power difference between the adjacent carriers exceeds the threshold that is set up on the basis of the maximum transmission power difference (MaxRLTxPwrDiff). The radio communication terminal 10 proceeds to the processing in step 32 when the transmission power difference between the adjacent carriers exceeds the threshold set up on the basis of the maximum transmission power difference. Meanwhile, when the transmission power difference between the adjacent carriers does not exceed the threshold set up on the basis of the maximum transmission power difference, the radio communication terminal 10 proceeds to the processing in step 35.

Here, as described previously, the threshold to be set up on the basis of the maximum transmission power difference may be equal to the maximum transmission power difference or may be a value smaller than the maximum transmission power difference (such as a value obtained by multiplying the maximum transmission power difference by a predetermined ratio (0.9)).

In step 32, the radio communication terminal 10 determines whether or not the control target carrier is the carrier which has lower transmission power and is included in the adjacent carriers. The radio communication terminal 10 proceeds to the processing in step 33 when the control target carrier is the carrier having lower transmission power. On the contrary, the radio communication terminal 10 proceeds to the processing in step 35 when the control target carrier is a carrier other than the carrier having lower transmission power.

In step 33, the radio communication terminal 10 determines whether or not the power control information corresponding to the control target carrier is the information being an instruction to decrease the transmission power. The radio communication terminal 10 proceeds to the processing in step 34 when the power control information is the information being an instruction to decrease the transmission power. On the contrary, the radio communication terminal 10 proceeds to the processing in step 35 when the power control information is the information being an instruction to increase the transmission power.

In step 34, the radio communication terminal 10 does not change the transmission power of the control target carrier without complying with the power control information being an instruction to decrease the transmission power. Alternatively, the radio communication terminal 10 may increase the transmission power of the control target carrier.

In step 35, the radio communication terminal 10 controls transmission power of the control target carrier in accordance with the power control information.

Lastly, the above-described processing in step 15 or step 17 (the closed loop control processing (3)) will be described with reference to FIG. 8. Note that the control target carrier is any one of the adjacent carriers in the closed loop control processing (1) and the closed loop control processing (2) described above. On the contrary, both of the adjacent carriers are the control target carriers in the closed loop control processing (3). In other words, the above-described step 15 and step 17 are executed simultaneously in the closed loop control processing (3).

Figure 8:
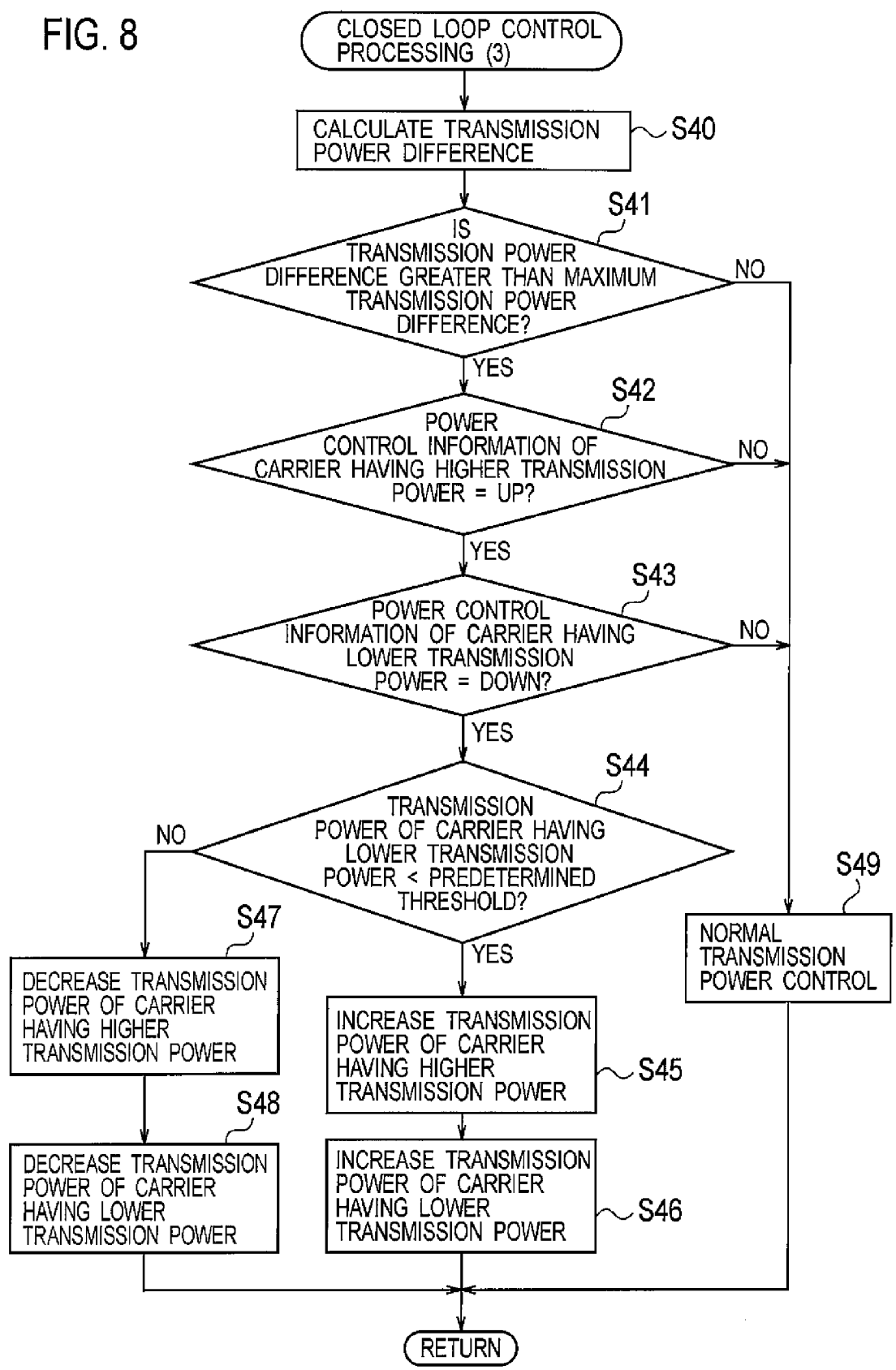
FIG. 8 is a flowchart showing the operation of the radio communication terminal 10 according to the first embodiment of the present invention (Pattern 4).

As shown in FIG. 8, in step 40, the radio communication terminal 10 calculates a difference in the transmission power (the transmission power difference) of the reverse link data between the adjacent carriers (the carrier #1 and the carrier #2).

In step 41, the radio communication terminal 10 determines whether or not the transmission power difference between the adjacent carriers exceeds the threshold that is set up on the basis of the maximum transmission power difference (MaxRLTxPwrDiff). The radio communication terminal 10 proceeds to the processing in step 42 when the transmission power difference between the adjacent carriers exceeds the threshold set up on the basis of the maximum transmission power difference. Meanwhile, when the transmission power difference between the adjacent carriers does not exceed the threshold set up on the basis of the maximum transmission power difference, the radio communication terminal 10 proceeds to the processing in step 49.

In step 42, the radio communication terminal 10 determines whether or not the power control information corresponding to the carrier which has higher transmission power and is included in the adjacent carriers is the information being an instruction to increase the transmission power. The radio communication terminal 10 proceeds to the processing in step 43 when the power control information corresponding to the carrier having higher transmission power is the information being an instruction to increase the transmission power. On the contrary, the radio communication terminal 10 proceeds to the processing in step 49 when the power control information corresponding to the carrier having higher transmission power is the information being an instruction to decrease the transmission power.

In step 43, the radio communication terminal 10 determines whether or not the power control information corresponding to the carrier which has lower transmission power and is included in the adjacent carriers is the information being an instruction to decrease the transmission power. The radio communication terminal 10 proceeds to the processing in step 44 when the power control information corresponding to the carrier having lower transmission power is the information being an instruction to decrease the transmission power. On the contrary, the radio communication terminal 10 proceeds to the processing in step 49 when the power control information corresponding to the carrier having lower transmission power is the information being an instruction to increase the transmission power.

In step 44, the radio communication terminal 10 determines whether or not the transmission power of the carrier which has lower transmission power and is included in the adjacent carriers is smaller than a predetermined threshold.

The radio communication terminal 10 proceeds to the processing in step 45 when the transmission power is smaller than the predetermined threshold. On the contrary, the radio communication terminal 10 proceeds to the processing in step 47 when the transmission power is equal to or above the predetermined threshold.

In step 45, the radio communication terminal 10 increases the transmission power of the carrier having higher transmission power (for example, by one step) in accordance with the power control information (UP) corresponding to the carrier having higher transmission power.

In step 46, the radio communication terminal 10 increases the transmission power of the carrier having lower transmission power (for example, by one step) without complying with the power control information (DOWN) corresponding to the carrier having lower transmission power.

In step 47, the radio communication terminal 10 decreases the transmission power of the carrier having higher transmission power (for example, by one step) without complying with the power control information (UP) corresponding to the carrier having higher transmission power.

In step 48, the radio communication terminal 10 decreases the transmission power of the carrier having lower transmission power (for example, by one step) in accordance with the power control information (DOWN) corresponding to the carrier having lower transmission power.

In step 49, the radio communication terminal 10 controls the respective transmission power of the adjacent carriers in accordance with the power control information pieces respectively corresponding to the adjacent carriers.

(Action and Effect)

According to the radio communication terminal 10 of the first embodiment of the present invention, when the transmission power difference between the adjacent carriers exceeds the threshold set up on the basis of the maximum transmission power difference (MaxRLTxPwrDiff), the communication controller 23 inputs the instruction information to the transmission power controller 21, the instruction information being an instruction to control the transmission power of the adjacent carriers without complying with the power control information corresponding to the adjacent carriers. Meanwhile, the transmission power controller 21 controls the transmission power of the adjacent carriers on the basis of the instruction information.

Specifically, when the power control information corresponding to the carrier which has higher transmission power and is included in the adjacent carriers issues an instruction to increase the transmission power, the transmission power controller 21 maintains the transmission power of the carrier having higher transmission power without change. Similarly, when the power control information corresponding to the carrier which has lower transmission power and is included in the adjacent carriers issues an instruction to decrease the transmission power, the transmission power controller 21 maintains the transmission power of the carrier having lower transmission power without change.

In this way, it is possible to maintain communications by multicarrier while suppressing interference between the adjacent carriers adjacent to each other with the predetermined frequency interval.

Moreover, according to the radio communication terminal 10 of the first embodiment of the present invention, when the power control information pieces respectively corresponding to the adjacent carriers are the information pieces each being an instruction to expand the transmission power difference between the adjacent carriers, the transmission power controller 21 increases the transmission powers of both of the adjacent carriers.

Thus, it is possible to suppress interference between the adjacent carriers while suppressing disconnection of the carrier having higher transmission power.

Furthermore, according to the radio communication terminal 10 of the first embodiment of the present invention, when the power control information pieces respectively corresponding to the adjacent carriers are the information pieces each being an instruction to expand the transmission power difference between the adjacent carriers, the transmission power controller 21 decreases the transmission powers of both of the adjacent carriers.

Accordingly, it is possible to suppress interference of the carrier having lower transmission power with other carriers although there is a higher possibility of disconnection of the carrier having higher transmission power.

[Second Embodiment]

A second embodiment of the present invention will be described hereinafter. In the following, differences between the first embodiment described above and the second embodiment will be mainly described.

Specifically, in the first embodiment described above, the radio communication terminal 10 determines whether or not to control the transmission power of the adjacent carriers in accordance with the power control information when the transmission power difference between the adjacent carriers exceeds the threshold set up on the basis of the maximum transmission power difference.

On the other hand, in the second embodiment, the radio communication terminal 10 determines whether or not the transmission power difference between the adjacent carriers is increasing and determines whether or not to control the transmission power of the adjacent carriers in accordance with the power control information when the transmission power difference between the adjacent carriers is increasing and when the transmission power difference between the adjacent carriers exceeds the threshold set up on the basis of the maximum transmission power difference.

(Configuration of Radio Communication Terminal)

Figure 9:
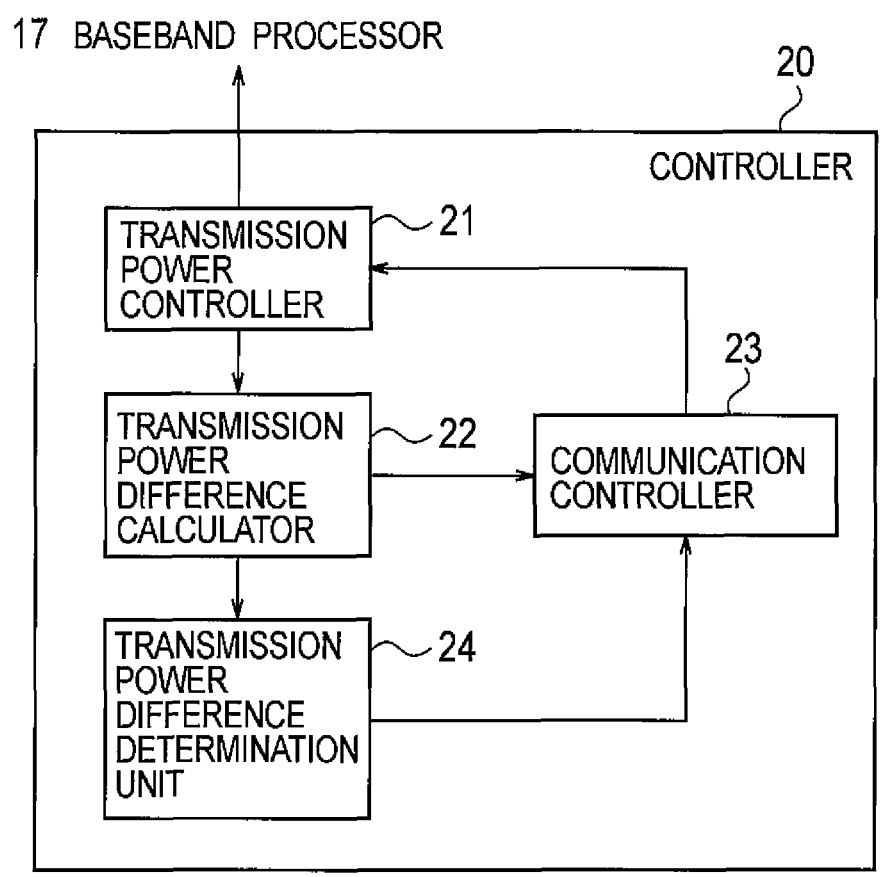
FIG. 9 is a functional block configuration diagram of a controller 20 according to a second embodiment of the present invention.

A configuration of the radio communication terminal according to the second embodiment of the present invention will be described hereinafter with reference to the drawings. FIG. 9 is a functional block configuration diagram showing the controller 20 of the radio communication terminal 10 according to the second embodiment of the present invention. It should be noted that in FIG. 9, similar reference numerals are assigned to the configuration similar to FIG. 4.

As shown in FIG. 9, the radio communication terminal 10 includes a transmission power difference determination unit 24, in addition to the transmission power controller 21, the transmission power difference calculator 22, and the communication controller 23.

The transmission power difference calculator 22 calculates a transmission power difference between adjacent carriers for each predetermined cycle (cycle in which the transmission power controller 21 performs transmission power control, for example).

The transmission power difference determination unit 24 determines whether or not the transmission power difference between the adjacent carriers has increased, the difference calculated by the transmission power difference calculator 22 for each predetermined cycle. Specifically, on the basis of the transmission power of the reverse link data, the transmission power difference determination unit 24 calculates an expression of an estimated curve (hereinafter referred to as an estimated curve expression) for each adjacent carrier, the estimated curve expression showing a situation where transmission power of the reverse link data changes on the time axis. Subsequently, the transmission power difference determination unit 24 determines whether or not a difference in values calculated by each of the estimated curve expressions (hereinafter referred to as an estimated curve difference) at a predetermined time exceeds an estimated curve difference threshold over a predetermined period. When the estimated curve difference between the adjacent carriers exceeds the estimated curve threshold over the predetermined period, the transmission power difference determination unit 24 informs the communication controller 23 of the fact that the estimated curve difference between the adjacent carriers exceeds the estimated curve threshold over the predetermined period.

Figure 10:
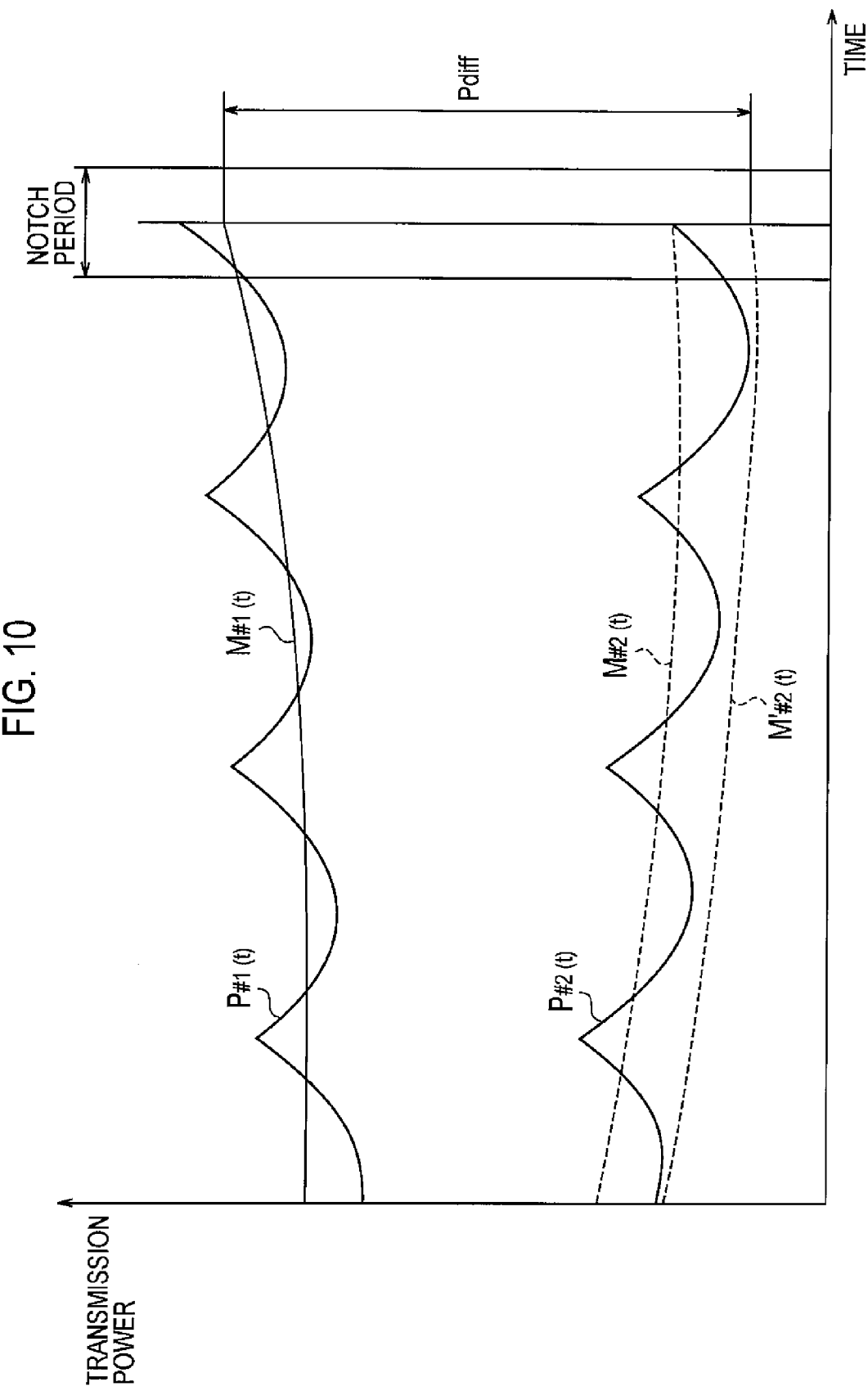
FIG. 10 is a graph for explaining calculation of an estimated curve difference (a difference of values calculated by estimated curve expressions of carriers) according to the second embodiment of the present invention.

For example, using the case where adjacent carriers are a carrier #1 and a carrier #2 as an example, the procedure for calculating an estimated curve difference between the carrier #1 and the carrier #2 will be described with reference to FIG. 10. Hereinafter, considered is the case where transmission power of the carrier #1 is larger than that of the carrier #2.

Here, a notch period is determined by notch intervals calculated on the basis of reception strength and reception quality (SIR). Specifically, the notch period includes a notch interval before a peak point of a transmission power estimated curve and a notch interval after the peak point. Meanwhile, the radio communication terminal 10 controls the transmission power of at least one carrier out of the adjacent carriers without complying with the power control information when the estimated curve difference between the adjacent carriers exceeds the estimated curve threshold throughout a predetermined period.

Specifically, when the transmission power of the carrier #1 at time t is set as "$P_{\#1}(t)$", an estimated curve expression "$M_{\#1}(t)$" of the carrier #1 is calculated by the following expression (1) where α is a coefficient corresponding to the carrier #1:

[Formula 1]

$$M_{\#1}(t)=\alpha \times P_{\#1}(t)+(1-\alpha)\times M_{\#1}(t-\Delta t) \qquad \text{Expression (1)}.$$

On the other hand, when the transmission power of the carrier #2 at the time t is set as "$P_{\#2}(t)$", an estimated curve expression "$M_{\#2}(t)$" of the carrier #2 is calculated by the following expression (2) where β is a coefficient corresponding to the carrier #2:

[Formula 2]

$$M_{\#2}(t)=\beta \times P_{\#2}(t)+(1-\beta)\times M_{\#2}(t-\Delta t) \qquad \text{Expression (2)}.$$

Furthermore, for the carrier #2 having lower transmission power, a lower estimated curve "M'$_{\#2}$(t)" of the carrier #2 is calculated by the following expression (3):
[Formula 3]

$$M'_{\#2}(t)=M_{\#2}(t)-\max\{_{M\#2}(t+\Delta t)-P_{\#2}(t+\Delta t)\} \quad \text{Expression (3).}$$

In addition, at the time t, a difference (estimated curve difference "P$_{diff}$") between a value calculated by the estimated curve expression of the carrier #1 and a value calculated by the lower estimated curve expression of the carrier #2 is calculated by the following expression (4):
[Formula 4]

$$P_{diff}=M_{\#1}(t)-M'_{\#2}(t) \quad \text{Expression (4).}$$

Subsequently, the transmission power difference determination unit 24 determines whether or not the estimated curve difference "P$_{diff}$" calculated by the expression (1) to the expression (4) exceeds the estimated curve difference threshold (P$_{thresh}$) for a predetermined period.

It is needless to say that an estimated curve difference "P$_{diff}$" may simply be a difference between a value calculated by the estimated curve expression "M$_{\#1}$(t)" and a value calculated by the estimated curve expression "M$_{\#2}$(t)", not a difference between the value calculated by the estimated curve expression "M$_{\#1}$(t)" and a value calculated by the lower estimated curve expression "M'$_{\#2}$(t)".

Here, the transmission power difference determination unit 24 may determine whether or not the estimated curve difference "P$_{diff}$" exceeds the estimated curve difference threshold (P$_{thresh}$) in the notch period.

When the fact that the estimated curve difference between the adjacent carriers exceeds the estimated curve threshold throughout the predetermined period and the fact that the transmission power difference between the adjacent carriers has exceeded the threshold set up on the basis of the maximum transmission power difference are informed, the communication controller 23 determines whether or not to control the transmission power of the adjacent carriers in accordance with the power control information.

(Operation of Radio Communication Terminal)

Figure 11:
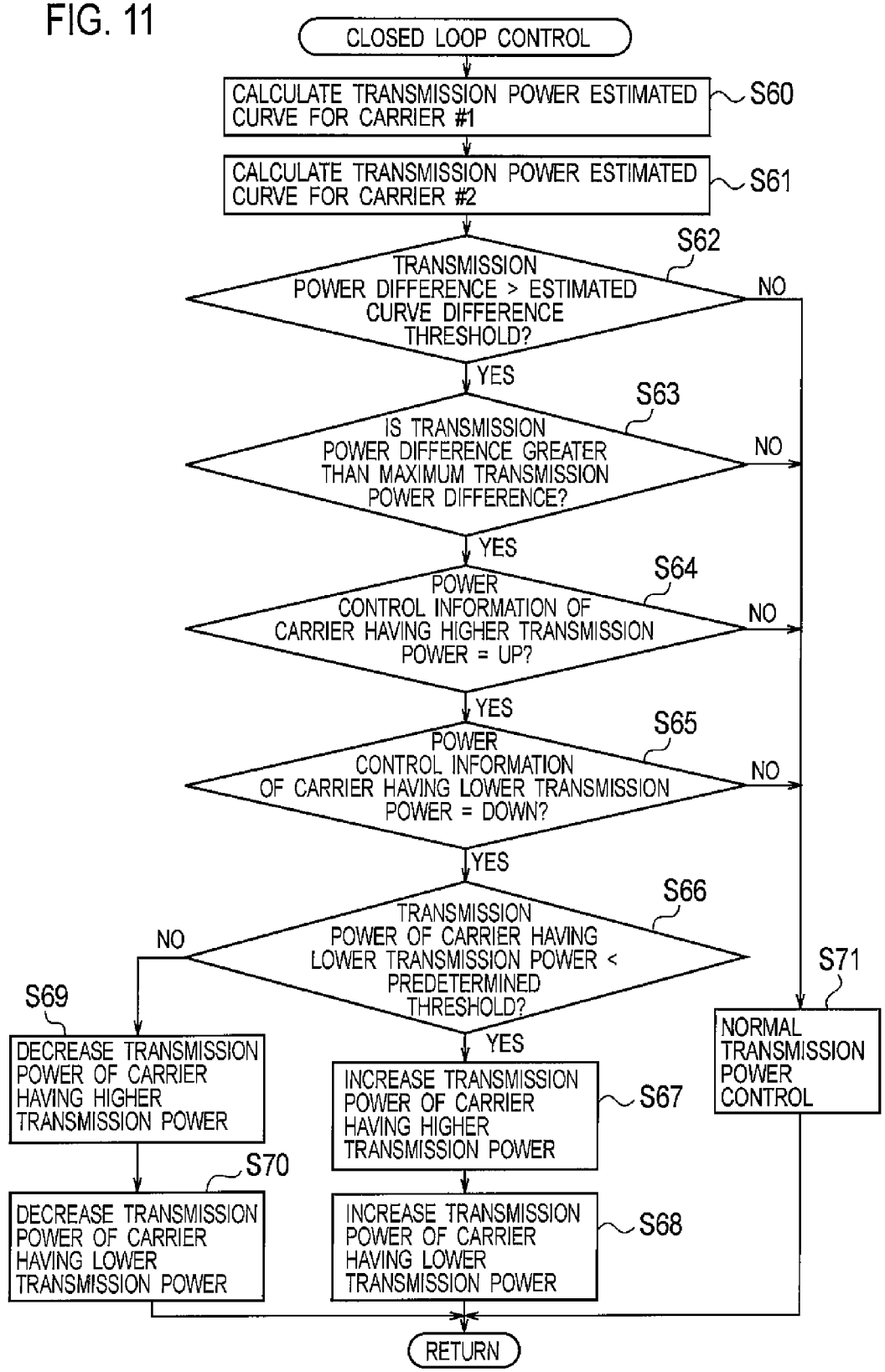
FIG. 11 is a flowchart showing the operation of a radio communication terminal 10 according to the second embodiment of the present invention.

The operation of the radio communication terminal according to the second embodiment of the present invention will be described below with reference to the drawing. FIG. 11 is a flowchart showing the operation of the radio communication terminal 10 according to the second embodiment of the present invention. Note that the closed loop control processing shown in FIG. 11 is executed instead of the above-described closed loop control processing shown in FIG. 9.

Hereinafter, as is the case of the first embodiment as described above, the case where adjacent carriers are a carrier #1 and a carrier #2 will be described as an example. In addition, the radio communication terminal 10 is assumed to transmit reverse link data to the radio base station 100a by using the carrier #1 and transmit reverse link data to the radio base station 100b by using the carrier #2. Furthermore, transmission power of the carrier #1 is assumed to be larger than that of the carrier #2.

As shown in FIG. 11, in step 60, the radio communication terminal 10 calculates an estimated curve expression of the carrier #1 on the basis of the transmission power of the reverse link data to be transmitted via the carrier #1 having higher transmission power.

In step 61, the radio communication terminal 10 calculates an estimated curve expression (or a lower estimated curve expression) of the carrier #2 on the basis of the transmission power of the reverse link data to be transmitted via the carrier #2 having lower transmission power.

In step 62, the radio communication terminal 10 determines whether or not the transmission power difference between the carrier #1 and the carrier #2 exceeds the estimated curve difference threshold on the basis of the estimated curve expression of the carrier #1 calculated in step 60 and the estimated curve expression (or the lower estimated curve expression) of the carrier #2 calculated in step 61. Specifically, the radio communication terminal 10 calculates a difference (the estimated curve difference) between a value calculated by the estimated curve expression of the carrier #1 and a value calculated by the estimated curve expression (or the lower estimated curve expression) of the carrier #2. Subsequently, the radio communication terminal 10 determines whether or not the estimated curve difference exceeds the estimated curve difference threshold throughout the predetermined period.

The radio communication terminal 10 proceeds to the processing in step 63 when the estimated curve difference exceeds the estimated curve difference threshold throughout the predetermined period. Meanwhile, when the estimated curve difference does not exceed the estimated curve difference threshold throughout the predetermined period, the radio communication terminal 10 proceeds to the processing in step 71.

In step 63, the radio communication terminal 10 determines whether or not the transmission power difference between the carrier #1 and the carrier 42 exceeds the threshold set up on the basis of the maximum transmission power difference. The radio communication terminal 10 proceeds to the processing in step 64 when the transmission power difference exceeds the threshold set up on the basis of the maximum transmission power difference. Meanwhile, when the transmission power difference does not exceed the threshold set up on the basis of the maximum transmission power difference, the radio communication terminal 10 proceeds to the processing in step 71.

Subsequently, in step 64 to step 71, the radio communication terminal 10 executes the processing similar to step 42 to step 49 shown in the above-described first embodiment. Specifically, when the power control information corresponding to the adjacent carriers is the information being an instruction to expand the transmission power difference, the radio communication terminal 10 controls the transmission power of the adjacent carriers without complying with the power control information. On the contrary, when the power control information corresponding to the adjacent carriers is not the information being an instruction to expand the transmission power difference, the radio communication terminal 10 controls the transmission power of the adjacent carriers in accordance with the power control information.

(Action and Effect)

According to the radio communication terminal 10 of the second embodiment of the present invention, the communication controller 23 determines whether or not to control the transmission power of the adjacent carriers in accordance with the power control information not merely in the case where the transmission power difference between the adjacent carriers exceeds the threshold set up on the basis of the maximum transmission power difference but in the case where the transmission power difference between the adjacent carriers is increasing and the transmission power difference between the adjacent carriers exceeds the threshold set up on the basis of the maximum transmission power difference.

Here, there may be a case where the transmission power of the carrier temporarily increases due to the open loop control or the closed loop control in association with deterioration in the reception quality influenced by fading or the like, for example. In such a case, even if the transmission power difference between the adjacent carriers temporarily exceeds the threshold set up on the basis of the maximum transmission power difference, it is highly likely that the transmission power difference between the adjacent carriers will fall within the maximum transmission power difference as long as the influence by facing or the like disappears.

As described above, according to the second embodiment of the present invention, it is possible to suppress unnecessary stopping of normal closed loop control in accordance with the power control information when the transmission power difference between the adjacent carriers temporarily exceeds the threshold set up on the basis of the maximum transmission power difference.

(Other Embodiments)

As described above, content of the present invention has been disclosed through one embodiment of the present invention. However, it should not be construed that the description and drawings constituting a part of this disclosure limit the present invention. Various alternative embodiments will be apparent to those skilled in the art from this disclosure.

For example, in the first embodiment and the second embodiment described above, it is determined whether or not to control the transmission power of the adjacent carriers in accordance with the power control information on the basis of whether or not the transmission power difference between the adjacent carriers exceeds the threshold set up on the basis of the maximum transmission power difference. However, the invention is not limited to this.

Specifically, it is also possible to determine whether or not to control the transmission power of the adjacent carriers in accordance with the power control information on the basis of whether or not a transmission power difference between two carries not adjacent to each other exceeds a predetermined threshold.

In this case, a predetermined threshold is defined in accordance with the distance between center frequencies of the two carriers being apart from each other. Specifically, as the center frequencies of the two carries are apart from each other farther, the two carriers interfere with each other to a lower extent. Thus, the predetermined threshold is defined at a low value.

Meanwhile, the processing from step 64 to step 71 in the second embodiment may be replaced by the processing shown in FIG. 6 or FIG. 7.

Moreover, the radio communication terminal may perform the transmission power control according to the above-described embodiments on the basis of power control information transmitted from the base station. Specifically, the radio communication terminal may perform control to maintain the transmission power or control to decrease the transmission power when the number of reception of the power control information within a predetermined period is more than a predetermined number, the power control information being an instruction to increase the transmission power. Similarly, the radio communication terminal may perform control to maintain the transmission power or control to increase the transmission power when the number of reception of the power control information within a predetermined period is more than a predetermined number, the power control information being an instruction to decrease the transmission power.

In addition, the operation of the radio communication terminal 10 according to the first to second embodiments as described above can be provided as an executable program in a computer.

In this way, it is needless to say that the present invention contains various embodiments that have not been described herein. Thus, a technical scope of the present invention shall be defined only by specific matters of the invention according to the scope of the claims that are reasonable from the above description.

The content of Japanese Patent Application No. 2006-207247 (filed on Jul. 28, 2006) is incorporated herein by reference in its entirety.

Industrial Applicability

As has been described above, the radio communication method and the radio communication terminals according to the present invention can maintain communications by multicarrier while controlling interference between adjacent carries which are adjacent to each other with a predetermined frequency interval. Accordingly, they are useful in radio communications such as mobile communications.

The invention claimed is:

1. A radio communication method in reverse link by multicarrier using at least a first carrier and a second carrier adjacent to the first carrier, the method comprising the steps of:
controlling transmission power in reverse link in accordance with received power control information, wherein
in the step of controlling the transmission power is controlled so that a transmission power difference between the first carrier and the second carrier does not exceed a maximum transmission power difference while not complying with the received power control information when the received power control information requests for an increase in the transmission power and when the transmission power difference exceeds the maximum transmission power difference.

2. The radio communication method according to claim 1, wherein in the step of controlling, processing to increase the transmission power of the carrier having higher transmission power out of the first carrier and the second carrier is stopped when the received power control information requests for an increase in the transmission power when the transmission power difference exceeds the maximum transmission power difference.

3. The radio communication method according to claim 1, wherein in the step of controlling, processing to decrease the transmission power of the carrier having lower transmission power out of the first carrier and the second carrier is stopped when the received power control information requests for a decrease in the transmission power when the transmission power difference exceeds the maximum transmission power difference.

4. The radio communication method according to claim 1, wherein in the step of controlling, the transmission powers of both of the first carrier and the second carrier are increased when, the received power control information requests an increase in the transmission power of the carrier having higher transmission power and requests a decrease in the transmission power of the carrier having lower transmission power when the transmission power difference exceeds the maximum transmission power difference.

5. The radio communication method according to claim 1, wherein in the step of controlling, the transmission powers of both of the first carrier and the second carrier are decreased when the received power control information requests an increase in the transmission power of the carrier having higher transmission power and requests a decrease in the transmission power of the carrier having lower transmission power when the transmission power difference exceeds the maximum transmission power difference.

6. The radio communication method according to claim 1, wherein
   the transmission power difference is calculated in a predetermined cycle, and
   in the step of controlling, the transmission power is controlled so that the transmission power difference between the first carrier and the second carrier does not exceed the maximum transmission power difference without complying with the received power control information when the transmission power difference is increasing.

7. A radio communication terminal which performs communications by multicarrier using at least a first carrier and a second carrier adjacent to the first carrier, the radio communication terminal comprising:
   a transmission power controller configured to control transmission power in reverse link in accordance with received power control information, wherein
   the transmission power controller controls the transmission power so that a transmission power difference between the first carrier and the second carrier does not exceed a maximum transmission power difference while not complying with the received power control information when the received power control information requests for an increase in the transmission power and when the transmission power difference exceeds the maximum transmission power difference.

8. The radio communication terminal according to claim 7, wherein the transmission power controller stops processing to increase the transmission power of the carrier having higher transmission power out of the first carrier and the second carrier when the received power control information requests for an increase in the transmission power when the transmission power difference exceeds the maximum transmission power difference.

9. The radio communication terminal according to claim 7, wherein the transmission power controller stops processing to decrease the transmission power of the carrier having lower transmission power out of the first carrier and the second carrier when the received power control information requests for a decrease in the transmission power when the transmission power difference exceeds the maximum transmission power difference.

10. The radio communication terminal according to claim 7, wherein the transmission power controller increases the transmission powers of both of the first carrier and the second carrier when the received power control information requests an increase in the transmission power of the carrier having higher transmission power and requests a decrease in the transmission power of the carrier having lower transmission power when the transmission power difference exceeds the maximum transmission power difference.

11. The radio communication terminal according to claim 7, wherein the transmission power controller decreases the transmission powers of both of the first carrier and the second carrier when the received power control information requests an increase in the transmission power of the carrier having higher transmission power and requests a decrease in the transmission power of the carrier having lower transmission power when the transmission power difference exceeds the maximum transmission power difference.

12. The radio communication terminal according to claim 7, wherein
   the transmission power difference is calculated in a predetermined cycle, and
   the transmission power controller controls the transmission power so that the transmission power difference between the first carrier and the second carrier does not exceed the maximum transmission power difference without complying with the received power control information when the transmission power difference is increasing.

* * * * *